No. 764,034. PATENTED JULY 5, 1904.
G. L. BRADLEY.
AGRICULTURAL MACHINE.
APPLICATION FILED DEC. 15, 1903.
NO MODEL. 2 SHEETS—SHEET 1.
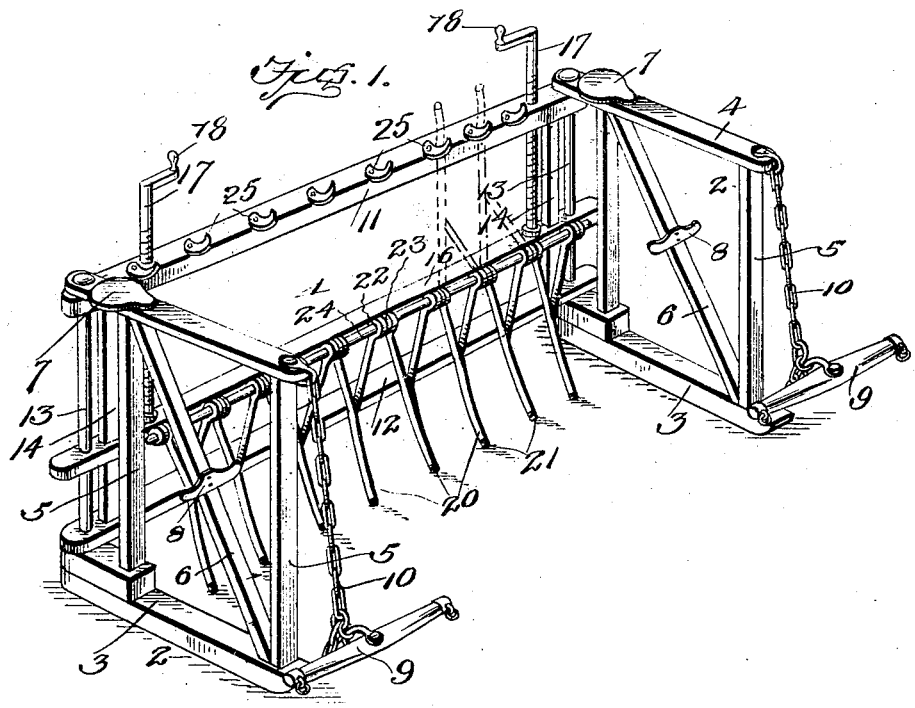
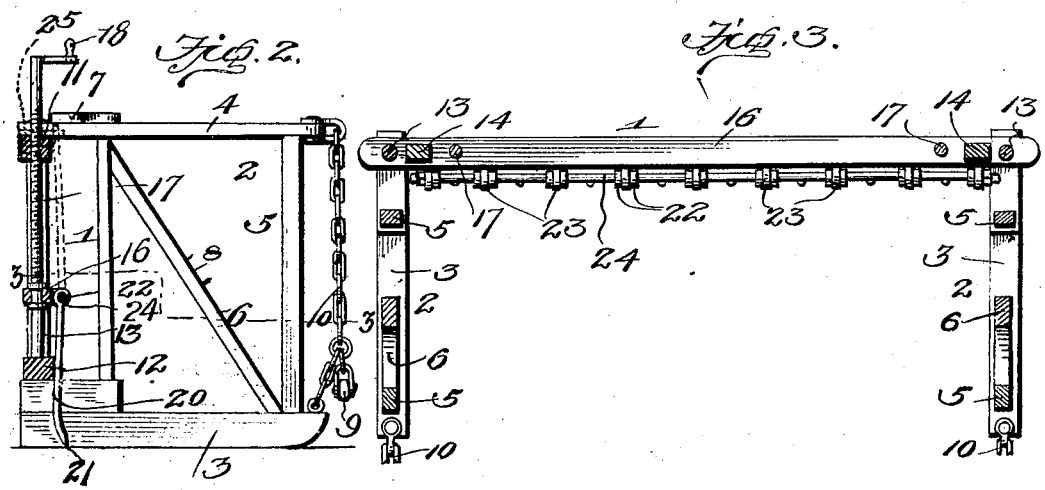
Witnesses
Inventor
G. L. Bradley
By
Attorney

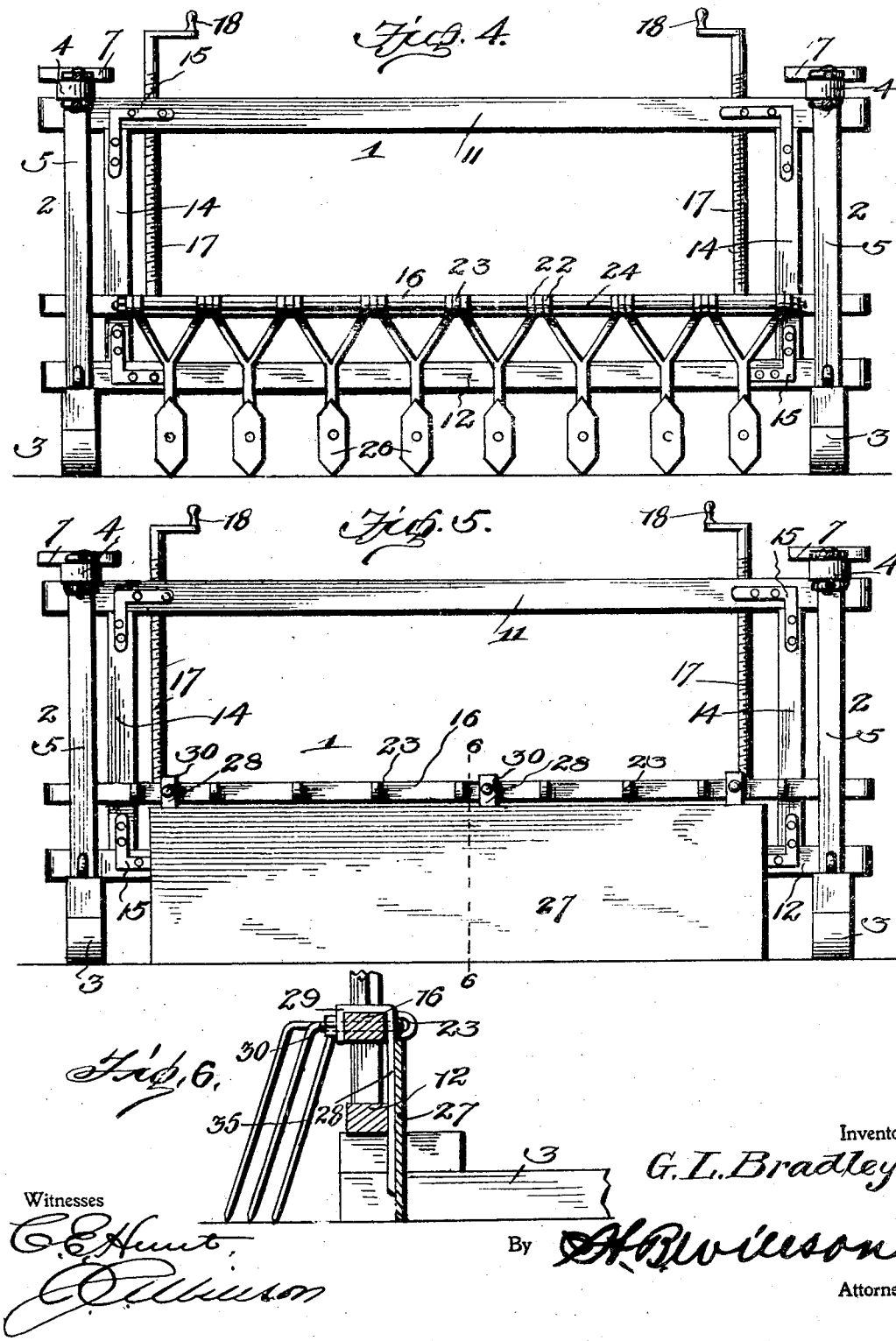

No. 764,034.

Patented July 5, 1904.

UNITED STATES PATENT OFFICE.

GEORGE L. BRADLEY, OF MAYVIEW, WASHINGTON.

AGRICULTURAL MACHINE.

SPECIFICATION forming part of Letters Patent No. 764,034, dated July 5, 1904.

Application filed December 15, 1903. Serial No. 185,304. (No model.)

*To all whom it may concern:*

Be it known that I, GEORGE L. BRADLEY, a citizen of the United States, residing at Mayview, in the county of Garfield and State of Washington, have invented certain new and useful Improvements in Agricultural Machines; and I do declare the following to be a full, clear, and exact description of the invention, such as will enable others skilled in the art to which it appertains to make and use the same.

My invention relates to an improved machine for performing various agricultural operations, such as raking hay, gathering manure, cultivating, plowing, ditching, or leveling land, grading roads, &c.

The object of my invention is to provide a machine of this character which will be simple in construction, comparatively inexpensive to produce, durable in use, and well adapted for various purposes.

With this and other objects in view the invention consists of certain novel features of construction, combination, and arrangement of parts, as will be more fully described, and particularly pointed out in the appended claims.

In the accompanying drawings, Figure 1 is a perspective view of my improved machine. Fig. 2 is a vertical front-to-rear sectional view. Fig. 3 is a horizontal sectional view. Fig. 4 is a front elevation of the machine, showing the same provided with shovels for cultivating, &c. Fig. 5 is a similar view showing the machine provided with a scraper for leveling, grading, &c. Fig. 6 is a detail sectional view taken on the line 6 6 of Fig. 5.

In the embodiment of my invention, as illustrated in the drawings, the numeral 1 denotes a vertically-disposed central frame, preferably rectangular in form, having vertically-disposed side or end frames 2, pivotally secured to its ends and supporting it above the ground. Said side supporting-frames are also preferably of rectangular form and are normally disposed at right angles to the central or main frame 1. Each of said side supporting-frames comprises a bottom beam 3, which forms a runner; a top beam 4, connecting uprights 5, and a diagonal brace 6. A seat 7 and a foot-rest 8 are provided on each of the side frames for an operator who drives the draft animal or animals attached to a tree or draft element 9, secured by a chain or other flexible connection 10 to the outer ends of said frames 2. The projecting rear ends of the top and bottom beams 4 and 3 are pivotally connected to the ends of the upper and lower longitudinal beams 11 and 12 of the center frame 1 by vertical tie bolts or rods 13, so as to permit said side frames to be swung to any desired angle in a horizontal plane. If it is desired, these supporting-frames 2 may be mounted upon wheels in any suitable manner and provided with suitable braking devices for controlling the speed of the machine in going downhill.

The upper and lower longitudinal beams 11 and 12 of said center frame 1 are connected adjacent to their ends by vertical uprights 14, and said frame is braced at each of its corners by angle-brackets 15, as shown. Mounted to slide vertically in the frame 1 upon the tie-rods 13 and the uprights 14 is a longitudinal beam 16, which may be adjusted and held in its adjusted position by any suitable means, but preferably by swiveling adjacent to its ends vertical screw-shafts 17, the upper portions of which work through screw-threaded openings in the upper beam 11 and are formed upon their upper ends with crank-handles 18, by means of which the operators may readily operate the screw-shafts to raise or lower the beam 16, as will be readily understood.

As shown in Fig. 1, the adjustable beam 16 is provided on its front side with a series of teeth 20, which may be straight, curved, or of any suitable form and construction for raking hay and performing like operations. Each of said teeth preferably comprises a pointed lower end 21 and a forked or bifurcated upper end, the arms of which are apertured or formed with eyes 22, which aline with eye-bolts 23, spaced along the beam 16 and adapted to receive a locking-rod 24, which passes through said alining eyes 22 and 23 to pivotally connect the teeth to said adjustable beam 16, allowing said teeth to be swung in a vertical plane. By pivoting the teeth in this manner any desired number of those mounted on the rod 24 may be swung down for use, those not in use resting against the upper beam 11, as shown by the dotted lines in Figs. 1 and 2, and secured to the same by hooks 25 or any other suitable fastening devices. The teeth which are in use bear against the front side of the lower beam 12 and are thereby supported at an angle, as shown.

In Fig. 4 of the drawings I have shown the lower ends of each of the teeth 20 provided with a shovel 26, by means of which the ground may be cultivated, as will be readily understood. Owing to the detachable pivotal connection of the teeth, any number of shovels may be used, and they may be arranged at any desired distance apart. Instead of using small shovels, as shown, large ones may be employed for plowing, ditching, and other purposes.

In Figs. 5 and 6 I have shown a scraper 27, secured upon the adjustable beam 16. Said scraper, which is preferably made of metal, is of slightly less length than the center frame 1 and has secured to its rear side two or more braces 28, having their upper ends projecting above said board and formed with hooks 29, which engage said beam 16. Bolts or pins 30 are preferably used for detachably securing them upon the beam, as shown in Fig. 6. Instead of using a flat scraper-blade, as shown in Figs. 5 and 6, a large bowl-scraper or a scraping device of any desired form may be used.

If it is found desirable, I may use rake-teeth 35, as shown in Fig. 6, in connection with the teeth 20, previously described. These teeth 35 are secured to the rear of the beam 16, so as to be raised and lowered with the latter, and they are of unequal length to form two or more rows. If desired, they may also be provided with cultivator-shovels.

The operation and advantages of my invention will be readily understood from the foregoing description, taken in connection with the accompanying drawings. It will be seen that when the side frames 2 are at right angles to the center frame and the draft-animals draw the machine forwardly upon the runners 3 of the side frames the raking-teeth, cultivator-shovels, scraping-board, or other device carried by the center frame will be moved over the ground to perform the desired work. By adjusting the screws 17 the device carried by the center frame may be readily raised or lowered to vary its operation. Owing to the pivotal connection of the side frames with the center frame, they may be swung so as to draw the center frame forwardly at any desired angle, which is of particular advantage in grading a road.

It will be understood that I do not limit myself to the adjusting means for the beam 16, (shown in the drawings,) since any suitable mechanism which will accomplish this result and which may be controlled by the operator when the machine is in motion may be provided. The frame 2 may also be mounted upon wheels, as previously stated, and numerous other tools or implements than those mentioned may be used upon the machine.

Various other changes in the form, proportion, and the minor details of construction may be resorted to without departing from the principle or sacrificing any of the advantages of this invention.

Having thus fully described my invention, what I claim as new, and desire to secure by Letters Patent, is—

1. In a machine of the character described, the combination of a center frame carrying an acting implement or device, side supporting-frames pivotally connected to said center frame, an implement-supporting beam carried by the center frame, and means for vertically adjusting said beam upon said frame.

2. In a machine of the character described, the combination of a center frame provided with guiding members at its ends, side supporting-frames pivotally connected to said center frame, a beam arranged longitudinally within the center frame and vertically adjustable upon said guides, and means for adjusting said beam, substantially as described.

3. In a machine of the character described, the combination of a vertically-disposed center frame comprising top and bottom beams, connections between the ends of said beams, said connections forming guiding members, an intermediate implement-supporting beam adjustable upon said guiding members, means for raising and lowering said supporting means, and side supporting-frames pivotally connected to said center frame, substantially as described.

4. In a machine of the character described, the combination of a center frame comprising upper and lower and intermediate beams, guides connecting the upper and lower beams and on which said intermediate beam is adjustably mounted, side supporting-frames pivotally connected to said center frame, and an implement pivotally mounted upon the adjustable implement-supporting beam and adapted to be respectively swung downwardly and upwardly into and out of operative position, and when in operative position to rest against the lower beam of the center frame, and when out of operative position to rest against the upper beam of the center frame, and means for fastening said implement in operative position.

5. In a device of the character described, the combination of a vertically-disposed center frame, an implement-supporting beam extending longitudinally of and adjustably mounted upon the same, and swinging supporting-frames at each end of said center frame, substantially as described.

6. In a device of the character described, the combination of a vertically-disposed center frame, supporting-frames pivotally connected adjacent to each end of said center frame, an adjustable beam on said center frame, said beam extending longitudinally of said frame, and an implement carried by said beam, substantially as described.

7. In a device of the character described, the combination of a vertically-disposed center frame, supporting-frames pivotally connected adjacent to each end of said center frame, a beam extending longitudinally of and slidably mounted in said center frame, means for adjusting said beam, and an implement carried by said beam, substantially as described.

8. In a device of the character described, the combination of a vertically-disposed center frame, supporting-frames pivotally connected adjacent to each end of said center frame, a beam in said center frame, rake-teeth pivotally connected to said beam and adapted to normally engage the ground, and means for fastening said teeth in an elevated position, substantially as described.

In testimony whereof I have hereunto set my hand in presence of two subscribing witnesses.

GEORGE L. BRADLEY.

Witnesses:
G. D. WILSON,
N. O. BALDWIN.